(No Model.)
J. W. WETMORE.
VEHICLE SEAT SPRING.
No. 389,033. Patented Sept. 4, 1888.
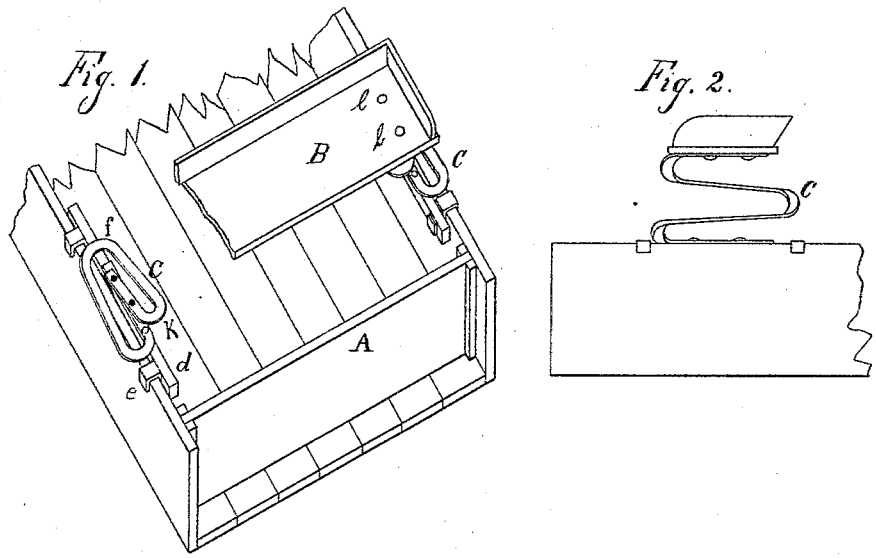
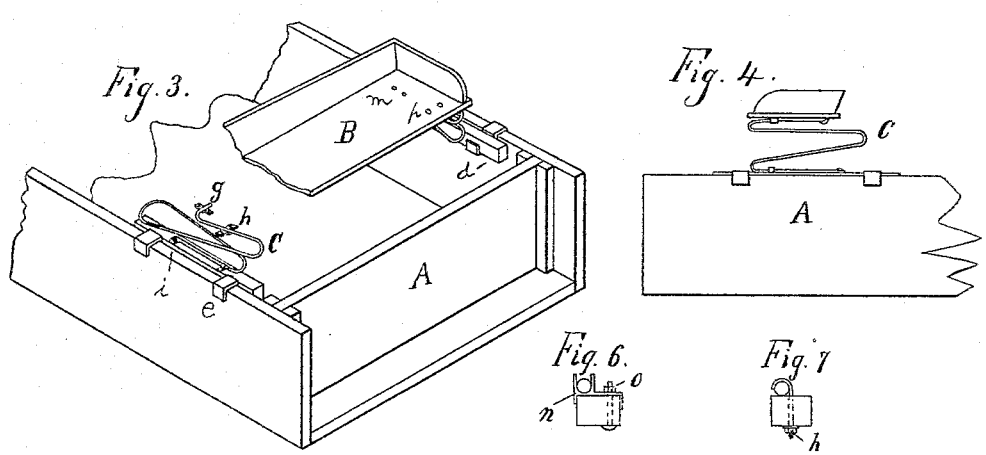
Witnesses.
L. D. Hanford.
Walter Scott.
Inventor.
Jerome W. Wetmore

UNITED STATES PATENT OFFICE.

JEROME W. WETMORE, OF ERIE, PENNSYLVANIA.

VEHICLE-SEAT SPRING.

SPECIFICATION forming part of Letters Patent No. 389,033, dated September 4, 1888.

Application filed September 20, 1886. Serial No. 214,095. (No model.)

*To all whom it may concern:*

Be it known that I, JEROME W. WETMORE, a citizen of the United States, residing at Erie, in the county of Erie and State of Pennsylvania, have invented a new and useful Vehicle-Seat Spring, of which the following is a specification.

My invention relates to spiral torsion-springs for vehicle-seats.

The ordinary spiral spring is supported by guides. The object of my improvement is to make it independent of guides. The cylindrical spiral spring in seat-springs is limited in its motion by resting on itself, and the conical spiral spring changes its easy movement into a quick motion by the large coils under pressure resting on their base of support. The torsion seat-spring held in bearings has links to connect its standards and their lever-arms.

The object of my invention is to give greater range of easy motion to the seat and do away with the links by means of having the ends of the spring fixed one to the seat and the other to the vehicle, and also to more nearly utilize for the spring the entire spring-bar. I attain these objects by the construction illustrated in the accompanying drawings, in which—

Figure 1 is a perspective view of the spring when constructed of a flat bar applied to a seat on a lumber-wagon; Fig. 2, an end view of the same; Fig. 3, a perspective view when made of a round steel bar; Fig. 4, the end or side view of this round-bar spring; Fig. 5, the supporting-bar with the base of the round spring attached; Fig. 6, a malleable-iron bearing for the point of the spring $j$, Fig. 5. The staple-shaped ends will be bent down on the spring. Fig. 7 represents another method of holding the spring at $j$, Fig. 5.

A is the body of the vehicle; B, the seat; C, the spring.

$d$ is the supporting-bar of the spring, bolted to hangers $e$. The bar and hangers may be made together of malleable iron.

$f$ is the bend in the spring of the longest radius, which is about double that of the bends at $k$. The lower bend at $k$, Fig. 1, should be inward, as in Fig. 3, and, preferably, the large curve at the front of the seat. The springs on a seat are preferably rights and lefts.

$l\ l$ are the bolts which hold the flat-bar spring to the seat; $m\ p$, the bolts which hold clips $g\ h$; $g\ h$, the clips which hold the upper arm of the round-bar spring under the seat.

$i$ is the end of the lower arm of the spring. It is flattened and bent in a horizontal plane in a direction opposite to that of the first upward curve in the spring and bolted to the bar $d$. It may be curved over onto the inside of the bar and bolted. This holds the end of the spring firm, while the clip $j$ will allow torsional motion in the lower arm as the clip at $h$ will in the upper.

If the flat-bar spring be made of narrow steel, the construction may be as represented in Figs. 3 and 5.

The clip $n$, if used, can be extended forward or back of the jaws, so as to give room for the nut of the bolt $o$, or the bolts at $i$ and $j$ may be screw-threaded, with nuts below, as represented.

Preferably the upper arm of the spring is parallel with the lower arm and directly over it. The bend in the end of the upper arm at $g$ terminates the torsional motion which takes place in the clip at $h$.

What I claim is—

1. The oblong spiral torsion-spring, in combination with the seat and the supporting-base on the body of the vehicle, substantially as described.

2. The vehicle-seat spring composed of the oblong loops and parallel upper and lower arms, the ends of the latter being firmly fixed under the seat and on its support on the body of the vehicle, substantially as described.

3. The vehicle-seat spring composed of the oblong loops, upper and lower arms, and the short sections at $i$ and $g$ on the ends of the arms proximately at right angles to and in a horizontal plane with them, substantially as described.

JEROME W. WETMORE.

Witnesses:
W. H. CAUGHEY,
WM. P. HAYES.